United States Patent
Adogla

(10) Patent No.: US 9,317,217 B1
(45) Date of Patent: Apr. 19, 2016

(54) WIPING AND VERIFYING STORAGE DEVICES

(75) Inventor: Eden G. Adogla, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 863 days.

(21) Appl. No.: 13/464,456

(22) Filed: May 4, 2012

(51) Int. Cl.
*G06F 12/00* (2006.01)
*G06F 3/06* (2006.01)

(52) U.S. Cl.
CPC ...... *G06F 3/0652* (2013.01); *G06F 2221/2143* (2013.01)

(58) Field of Classification Search
CPC .......................................................... G06F 12/00
USPC .......................................................... 711/166
See application file for complete search history.

(56) References Cited

U.S. PATENT DOCUMENTS

| | | | |
|---|---|---|---|
| 2006/0158940 A1* | 7/2006 | Shappir et al. | 365/185.29 |
| 2009/0307716 A1* | 12/2009 | Nevarez et al. | 719/326 |
| 2010/0174847 A1* | 7/2010 | Paley et al. | 711/103 |
| 2010/0228903 A1* | 9/2010 | Chandrasekaran et al. | 711/6 |
| 2010/0306577 A1* | 12/2010 | Dreifus et al. | 714/6 |
| 2011/0055588 A1* | 3/2011 | DeHaan | 713/189 |

* cited by examiner

*Primary Examiner* — Adam M Queler
*Assistant Examiner* — Kenneth Tsang
(74) *Attorney, Agent, or Firm* — Sutherland Asbill & Brennan LLP

(57) ABSTRACT

Systems and methods for wiping and verifying the wiping of a data storage device where the dirtying of blocks of the storage device is tracked and only the dirtied blocks are scanned to verify if the storage device has been sufficiently wiped.

31 Claims, 7 Drawing Sheets

WIPING AND VERIFYING STORAGE DEVICES

BACKGROUND

With increasing availability of inexpensive communications bandwidth, remote computing or cloud computing, where processing and storage resources may be located remotely from the point of usage of the processing and storage resources, has become more widely available. Third party entities may offer these remote computing resources to organizations and individual users remotely from the organizations and users. Remote computing methods may, therefore, enable an organization to outsource its information technology needs to an outside vendor and allow the outside vendor to provide processing and storage resources, as well as information security, scalability, reliability, and the like.

The third party providers of the remote computing resources may, in turn, make relatively effective use of computing resources by centralizing the resources and providing computing resources to multiple organizations and users. In so doing, remote computing providers may have a plurality of computers or servers and a plurality of storage devices to meet the computing and storage needs of the multiple organizations and/or individuals for whom the remote computing providers provide service. The remote computing resources, and in particular, computing storage capacity that is used by one organization or user, may subsequently be provided to another organization or user by the providers of the remote computing resources. When providing the storage capacity to a new organization or user, for various reasons including data security, the storage capacity may need to be erased before providing the storage capacity to the new organization or user.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures.

DETAILED DESCRIPTION

Overview

Figure 1:
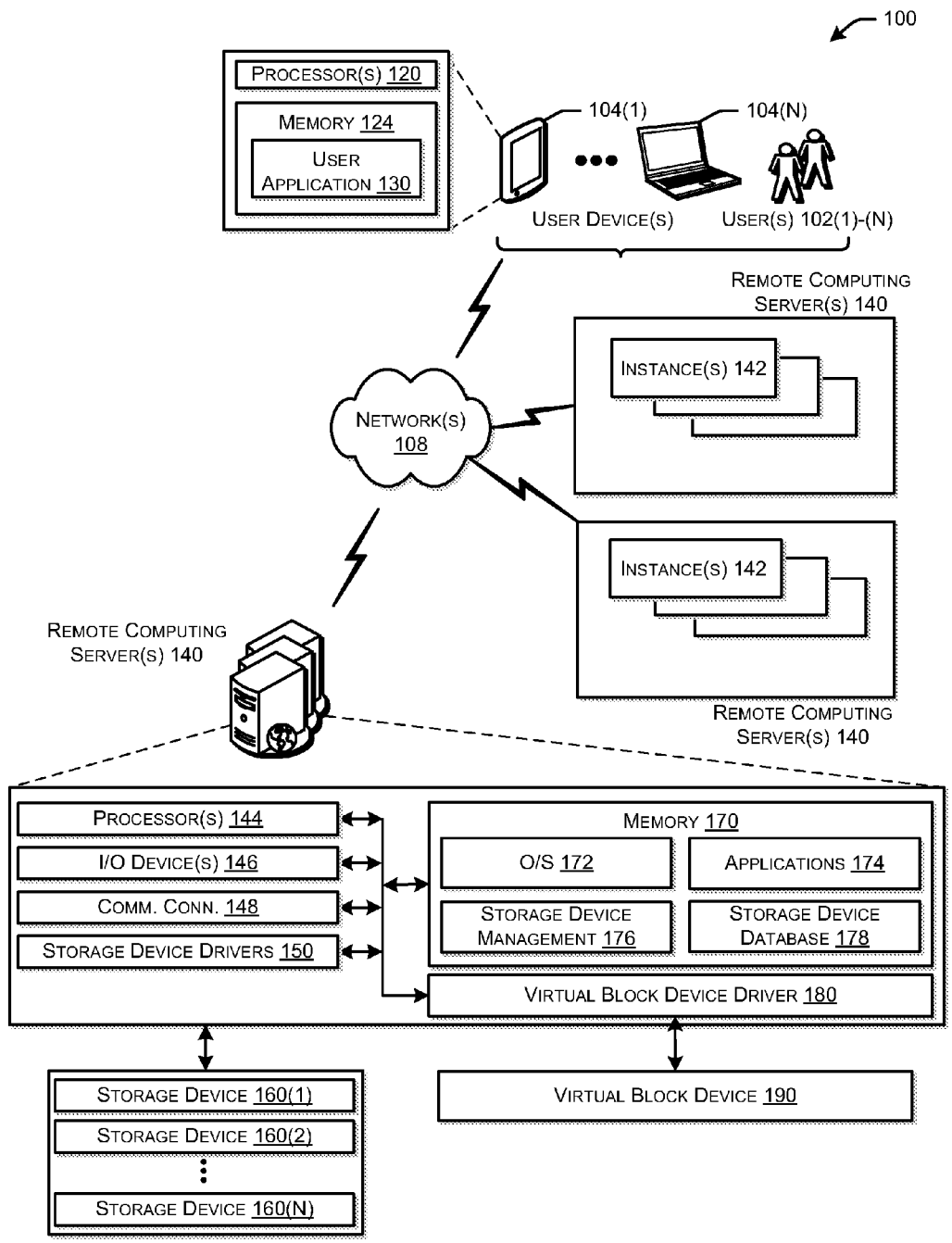
FIG. 1 is a schematic diagram that illustrates an example architecture for providing remote computing services including remote data storage, in accordance with embodiments of the disclosure.

Embodiments of the present disclosure are directed to, among other things, providing computing storage capacity and computing resources remotely, and particularly wiping and verifying the wiping of the storage capacity. Storage capacity may be provided remotely to a first organization or user. This storage capacity may be leased or rented to the organization or user and may be provided from one or more storage devices located at or near the provider of the remote computing resources. For example, the processing and/or storage capacity resources may be available to the organization or user as a virtual machine "instance." The storage capacity may be returned by the first organization or user by, for example, no longer renting or leasing the storage capacity or portions thereof. In other words, the virtual machine instance to that particular organization or user may be terminated. The provider of the remote computing resources may provide the storage capacity, or portions thereof, to another organization or user. Before providing the storage capacity to the new organization or user, the provider of the remote computing resources may erase the storage capacity and subsequently verify that the storage capacity has been sufficiently erased. It may be necessary to erase the storage capacity to prevent data and information associated with the first organization or user to be available or retrievable by the next or subsequent organizations or users of that storage capacity. Not adequately erasing the storage capacity may have implications related to information security, information theft, and sharing of proprietary and/or personal information. Erasing and verifying the erasure of the storage capacity may, in certain cases, be time-consuming and may, therefore, delay the offering of the storage capacity to subsequent users, resulting in potential reduction of the utilization and revenue realization from the storage capacity.

Storage capacity, as used herein, may refer to any form of electronic storage that may be used and/or may be available to a particular organization or individual user to store electronic information or data. The information or data may be in any form of analog or digital data. In certain embodiments, digital data storage capacity may be offered by the provider of remote computing resources. Electronic information or data stored on the storage capacity may include, but is not limited to, computer files, documents, audio files, video files, other media files, computer programs, applications, scripts, files containing proprietary, confidential, personal, or sensitive information, or combinations thereof.

It will further be appreciated that the storage capacity provided to a particular organization or individual user may include one storage device, portions of a storage device, more than one storage device, or more than one portion of the storage devices. For example, if a particular user requires 10 terabytes (Tb) of storage capacity, then the provider of the remote computing resources may allocate five 2 Tb hard disk drives (HDDs) to provide the full 10 Tb requirement. Alternatively, the 10 Tb capacity may be provided using three 3 Tb HDDs and 1 Tb of a 3 Tb HDD. The storage devices, or portions thereof, that provide the storage capacity to the organization or user of the remote computing resources may be of any suitable type of data storage or mass storage device with any suitable storage capacity. The storage devices may be, for example, any combinations of HDDs of any format and interface(s), optical storage drives, opto-magnetic storage drives, compact disc (CD) drives, digital video disc (DVD) drives, solid state storage drives, flash memory drives, or the like.

The storage devices, such as HDDs, may further have a plurality of segments of predefined storage sizes. For the purposes of the discussion herein, the segments may be referred to as blocks, sectors, or segments, interchangeably. In certain embodiments of the disclosure, the process of erasing and verifying the erasing may be conducted on a block-by-block basis. In other words, a block may be the smallest subdivision of a particular storage capacity, and storage device(s) associated therewith, that may be erased and verified for erasure in certain embodiments of the disclosure. In other embodiments of the disclosure, portions of a block may be erased and the erasure of that portion of the block may be verified. A block may be of any suitable size, such as 512 bytes or 4,096 bytes.

In certain embodiments of the disclosure, a virtual block device may be slaved off of the storage capacity offered to a user. As the user uses the storage capacity and writes data to the one or more storage devices associated with the storage capacity, the virtual block device may generate and/or update a map of which blocks of the storage devices have been dirtied or written to. The virtual block device may, in certain embodiments, receive input from one or more processors or drivers of the storage devices to enable the mapping of dirtied blocks of the storage devices. The virtual block device may further be accessed by the one or more processors so that the one or more processors may retrieve a mapping of dirtied blocks of the storage capacity from the virtual block device. The block map may provide an indication to the one or more processors of the blocks of a particular storage device that have been dirtied or used. In certain embodiments, the virtual block device may stop slaving off of a particular storage device if substantially all of the blocks of the storage device are dirtied or used for data storage. In certain other or the same embodiments, the virtual block device may track the blocks that have been wiped during the wiping process. In one aspect, slaving off of the storage capacity and storage devices associated therewith may entail erasing previously stored mappings on the virtual block device. The virtual block device may be erased at any time by any suitable entity, such as one or more processors that may be communicatively coupled to the virtual block device. In other words, the mapping of dirtied or used blocks of a storage capacity or associated storage devices may be erased When the storage capacity is no longer needed by the user, there might be an indication received that the storage capacity and each of the storage devices associated with the storage capacity need to be wiped. Upon receiving the indication, the storage devices associated with the storage capacity may be wiped by one or more servers used for providing remote computing services. The wiping may then be verified to make sure that the storage device has been sufficiently wiped. In this case, sufficient wiping may entail wiping, zeroing, or otherwise erasing a predetermined number and/or a predetermined percentage of the dirtied blocks and/or total blocks. The process of confirming or verifying the wiping or erasing of the storage capacity may be a time-consuming process and, therefore, may consume relatively high levels of resources. Accordingly, scanning and verification of the wiping of only the dirtied blocks may be performed for the storage capacity in accordance with embodiments of the disclosure. The verification process may be executed by determining which of the blocks of the storage capacity have been used for data storage by accessing the dirtied block mapping as generated by the virtual block device. The dirtied block mapping may include information on which of the blocks of the storage capacity and associated storage devices have been dirtied during usage. After wiping the storage capacity and associated storage devices, the dirtied block mapping may be used to verify the wiping of only those blocks that were dirtied during the usage of the storage capacity. As a result, the blocks that were not dirtied during usage of the storage capacity may not be verified for wiping or erasure. This selective block verification of wiping may allow for verification of a smaller number of blocks and, therefore, may result in savings of time, computing resources, energy, and/or other resources in the verification of the wiping of the storage capacity.

In other embodiments of the disclosure, when the storage capacity is to be wiped, the virtual block device may be accessed and a corresponding dirtied block mapping of the storage capacity may be retrieved therefrom. The dirtied block mapping may correspond to one or more and/or all of the storage devices that correspond to the storage capacity. The dirtied block mapping may be used to wipe only those blocks that have been dirtied during the use of the storage capacity. Furthermore, only the dirtied blocks may be verified for wiping using the same dirtied block mapping from the virtual block device. As a result, only a subset corresponding to the dirtied or used blocks may be both wiped and verified for wiping. Wiping and verifying only a subset of blocks of the storage capacity and the associated storage devices may result in savings of time, computing resources, energy, and/or other resources.

In yet other embodiments of the disclosure, when the storage capacity is to be wiped, a first dirtied block mapping of the storage capacity and associated storage devices may be retrieved from the virtual block device. This first dirtied block mapping may be stored in memory. The wiping process may then be conducted. In this case, the wiping may be conducted for all blocks of the storage capacity or only for the storage capacity blocks that were dirtied. The dirtied blocks may be determined and zeroed or wiped based on the first dirtied block mapping as retrieved from the virtual block device. The virtual block device may be reset or otherwise erased of its mapping prior to wiping the storage capacity. During the wiping of the storage capacity, the virtual block device may again be slaved off of the storage capacity and the storage devices associated therewith. Therefore, the virtual block device may generate a mapping of all of the blocks of the storage capacity and its constituent storage devices that have been zeroed during the wiping process. Therefore, at the end of the wiping process, the virtual block device may have mapping of all of the blocks that have been erased. At this point, after the wiping of the storage capacity, a second dirtied block mapping may be retrieved from the virtual block device. The second dirtied block mapping, representing the blocks that have been wiped, may be compared to the first dirtied block mapping, representing the blocks that had been dirtied during usage of the storage capacity. The comparison, such as a block-by-block comparison, may be used to determine if the storage capacity has been sufficiently wiped. In one aspect, if a dirtied block from the first dirtied block mapping is shown to be wiped based on the second dirtied block mapping, then that block may be determined to have been wiped during the wiping process. Therefore, by comparing the dirtied blocks from the first dirtied block mapping to the wiped blocks from the second dirtied block mapping, the wiping of each of the blocks may be determined. If a predetermined number and/or a predetermined percentage of the blocks of the storage capacity and/or the dirtied blocks have been erased, then the storage capacity may be deemed sufficiently wiped.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts an illustrative system or architecture 100 in which techniques for providing remote computing services or remote data storage may be implemented. In architecture 100, one or more users 102(1)-(N) may utilize user computing devices 104(1)-(N) (collectively, user devices 104) that include one or more processors 120 communicatively coupled to one or more memories 124 (herein referred to as memory 124), to execute one or more user applications 130 or software instructions. The one or more user applications 130 may be stored on the memory 124 and accessed by the processors 120 from the memory 124. The user devices 104 may further be configured to communicate via one or more networks 108 with one or more remote computing server(s) 140 (herein referred to as remote computing servers 140).

The user 102, as used herein, may refer to either an organization or an individual. The organization may be a company, non-profit organization, for-profit organization, a religious organization, a community organization, a government agency, or the like. The user devices 104 may be any variety of computing devices including, but not limited to, servers, desktop computers, notebook computers, netbook computers, tablet computing devices, pad computing devices, personal digital assistants (PDAs), smart phones, digital readers, or combinations thereof. In some cases, the user devices 104 may be "intelligent devices" that may execute one or more programs and user applications 130 locally on the processor 120. In other cases, the user devices 104 may be "dumb terminals" configured to primarily execute software, programs, or user applications 130 related to serving, displaying, or otherwise rendering information or content provided from sources external to the user device 104, such as from the remote computing servers 140. Indeed, the architecture 100 may include both "intelligent devices" and "dumb terminals." Furthermore, the architecture may include a variety of user device types. For example, there may be multiple users 102 each accessing the remote computing servers 140 via different types of user devices 104. In one aspect, the remote computing servers 140 may run virtual machine instances 142, hereinafter referred to as instances 142. Each of these instances 142 may be provided to a different organization or user. In effect, multiple instances 142 of computing resources and storage capacity may be allocated from a single remote computing server 140 or group of servers 140. Therefore, when computing resources and/or storage resources are provided to a user 102 a new instance 142 may be launched on the computing servers 140. When a user returns the computing resources and/or the storage capacity, the instance 142 associated therewith may be terminated.

The one or more user applications 130 may be run on the user device 104 to process files and data locally on the user device 104. The files and data may in one aspect be saved locally on the user device 104, such as in memory 124, or be transmitted to the remote computing servers 140 to be stored thereon, or both. As an example, consider that a user 102 opens and processes a spreadsheet file. The spreadsheet file may be opened locally on the user device 104 using a spreadsheet application corresponding to the spreadsheet file. After a user 102 manipulates the spreadsheet file on the user device 104, the user 102 may choose to save the spreadsheet file locally on the user device 104, send the file to the remote computing servers 140 for storage, or both save the file locally and remotely. In certain embodiments, the user 102 may access and use remote applications that may be run remotely from the user device 104, such as at the remote computing servers 140. For example, a user 102 may open and manipulate a word processing file, and the word processing application program with which the user 102 interacts may be executed on the remote computing servers 140. Therefore, the word processing file may be stored, accessed, and manipulated remotely from the user device 104. The user device 104 may have one or more user applications 130 running thereon that may render the operation of the word processing program on a user display or user interface of the user device 104. In one aspect, the user applications 130 may be configured to receive data from the remote computing servers 140 via the network 108 and render the same for display or rendering to the user 102. The user applications 130 may further receive user input on the user device 104 and convey the input to the remote computing servers 140 via the network 108. Other non-limiting interactions between the user device 104 and the remote computing servers 140 may include executing applications on the remote computing servers 140 and storing files and data on the user device 104, or storing the files or data at both the remote computing servers 140 and locally and executing the applications that use the files or data at the remote computing servers 140.

The networks 108 may include any one or a combination of different types of suitable communications networks, such as cable networks, the Internet, wireless networks, cellular networks, and other private and/or public networks. Furthermore, the networks 108 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. While the illustrated example represents the users 102 accessing the remote computing servers 140 over the networks 108 using the user device 104, it will be appreciated that the users 102 may access one or more other elements via the network 108. It is also noted that the described techniques may apply in other client/server arrangements (e.g., set-top boxes, etc.), as well as in non-client/server arrangements (e.g., locally stored software applications, etc.).

The remote computing servers 140 may be any type of computing devices such as, but not limited to, mobile, desktop, thin-client, servers, minicomputers, blade servers, supercomputers and/or cloud computing devices. In certain embodiments, the remote computing servers 140 may include one or more servers, perhaps arranged in a cluster, as a server farm, or as individual servers not associated with one another. These remote computing servers 140 may be configured to receive, store, and/or process information associated with interactions with the user devices 104. In addition, the remote computing servers 140 may be configured to process data and files received from the user devices 104 and store the data and files remotely from the user devices 104. Yet further, the remote computing servers 140 may be configured to provide computing and/or data processing capability to users 102 via their user devices 104 remotely over the network 108.

In one illustrative configuration, the remote computing servers 140 may include one or more processing units (or processor(s)) 144. In some examples, the processor(s) 144 of the remote computing servers 140 may be implemented as appropriate in hardware, software, firmware, or combinations thereof. Software or firmware implementations of the processor(s) 144 may include computer-executable or machine-executable instructions written in any suitable programming language to perform the various functions described. Hardware implementations of the processor(s) 144 may be configured to execute computer-executable or machine-executable instructions to perform the various functions described. The processors 144 may include, but are not limited to, one or more of microprocessors, multi-core processors, microcontrollers, field programmable gate arrays (FPGAs), digital signal processors (DSPs), application-specific integrated circuits (ASICs), or combinations thereof.

The remote computing servers 140 may further include input/output (I/O) device(s) 146, such as a keyboard, a mouse, a pen, a voice input device, a touch input device, a display, speakers, a printer, etc. The remote computing servers 140 may also include communications connection(s) 148 that allow the remote computing servers 140 to communicate with stored databases, other computing devices or servers, user terminals, and/or other devices on the networks 108.

The remote computing servers 140 may yet further include one or more storage device drivers 150 for controlling one or more storage devices 160(1)-(N), herein collectively referred to as storage devices 160. The storage device drivers 150 may cooperate with the processor 144 to read and write information to the storage devices 160. In one aspect, the remote computing server 140 may provide storage capability remotely to users 102 and user devices 104 by providing user 102 access to the storage devices 160 via the processors 144 and the storage device drivers 150.

The storage devices 160 may be of any suitable type of non-volatile or volatile storage device. Any suitable physical mechanism for storage may be used for storing data on the storage devices 160 including, for example, magnetic, optical, or electrical charge mechanisms for storing data. Types of storage devices 160 may include, for example, any combinations of hard disk drives (HDDs) of any format and interface(s), optical storage drives, opto-magnetic storage drives, compact disc (CD) drives, digital video disc (DVD) drives, solid state storage drives, flash memory drives, or the like.

During operation, the processors 144 may be configured to receive instructions from the user devices 104 via the network 108 and based at least in part on the instructions may access the storage devices 160 to retrieve data from the storage devices 160 or store data thereon. In other words, a user 102 via the user device 104 may attempt to access particular information that is stored remotely on the storage device 160 to be rendered on the user device 104. Responsive to the attempt, the user device 104 and the user applications 130 running thereon may send instructions to the processors 144 to provide the requested information. The processors 144 may determine where the requested information is stored, such as a particular device 160(1)-(N) on which the information is stored and the blocks on the particular device 160(1)-(N). The processor may further invoke the storage device drivers 150 to fetch the requested information from the storage devices 160. The processors 144 may then transmit the information to the user device 104 via the network 108. Similarly, the user device 104 may transmit information or data for storage to the remote computing servers 140 via the network 108, and the information or data may be received by the processors 144. The processors 144 may then invoke the storage device drivers 150 to store the data on the storage devices.

The remote computing servers 140 may further include one or more memories 170, herein referred to as memory 170. The memory 170 may store program instructions that are loadable and executable on the processor(s) 144, as well as data generated during the execution of these programs. Depending on the configuration and type of remote computing servers 140, the memory 170 may be volatile (such as random access memory (RAM)) and/or non-volatile (such as read-only memory (ROM), flash memory, etc.). In some implementations, the memory 170 may include multiple different types of memory, such as static random access memory (SRAM), dynamic random access memory (DRAM), and/or ROM.

The memory 170 and/or the storage devices 160, both removable and non-removable, are all examples of computer-readable storage media. For example, computer-readable storage media may include volatile and non-volatile, removable and non-removable media implemented in any method or technology for storage of information such as computer-readable instructions, data structures, program modules, and/or other data.

Turning to the contents of the memory 170 in more detail, the memory 170 may include an operating system module 172, one or more application programs or applications 174, a storage device management module 176, and a storage device database 178. Each of the modules and/or software may provide functionality for the remote computing servers 140, when executed by the processors 144. The modules and/or the software may or may not correspond to physical locations and/or addresses in memory 170. In other words, the contents of each of the modules may not be segregated from each other and may, in fact be stored in at least partially interleaved positions on the memory 170.

The operating system module 172 may have one or more operating systems stored thereon. The processors 144 may be configured to access and execute one or more operating systems stored in the operating system module 172 to operate the system functions of the remote computing servers 140. System functions, as managed by the operating system may include memory management, processor resource management, driver management, application software management, system configuration, and the like. The operating system may be any variety of suitable operating systems including, but not limited to, Microsoft® Windows®, Microsoft® Windows® Server®, Linux, Apple® OSX®, or the like.

The applications 174 may include any variety of application software that may be executed in conjunction with the operating system that the processor 144 may be utilizing for the remote computing servers 140. The applications 174 may include any variety of software that may be utilized for any purpose. For example, the applications may include, but not be limited to, drawing programs, image processing programs, audio processing programs, word processing, spreadsheet programs, database management programs, enterprise resource planning programs, presentation programs, personal finance programs, tax preparation programs, accounting programs, statistical analysis programs, computer-aided manufacturing programs, computer-aided design programs, games and entertainment programs, educational programs, web-viewers, or combinations thereof.

In certain embodiments, applications 174 may be executed on the processors 144 on behalf of a user 102 accessing the application via the user device 104 and the network 108. In other words, the user may access his/her user device 104 and the processor 120 thereon may communicate with the processors 144 of the remote computing servers 140 and instruct the processors 144 to execute a particular application using resources of the remote computing servers 140 for the benefit of the user. Responsive to the instructions, the processors 144 may launch and/or execute the particular application and may communicate data associated therewith to render any user output on the user device 104 or to accept any user input from the user device 104 and communicate the input to the application, via the processor 120, the network 108, and the processors 144. Therefore, a user 102 may be able to control, use, and interact with an application 174 running on the remote computing servers 140 from a remote location, such as at the user device 104 location.

The memory 170 may further include a storage device management module 176. The storage device management module 176 and code stored thereon, may be executed by the processor 144 to provide operations for distributing and managing storage capacity to users 102 and user devices 104. In other words, the instructions and programs stored on the storage device management module 176 may enable the processor 144 to manage and track the allocation of individual storage devices 160(1)-(N), or portions thereof, to provide the storage capacity required by the user 102 by using the capabilities of the remote computing servers 140. For example, if the remote computing servers 140 are used by three different remote clients, such as users 102, and each user 102 has a particular allocation of storage capacity, then the instructions and programs stored on the storage device management module 176 may help in allocating, segregating, and otherwise managing the storage capacity of each of the three clients. The storage device management module 176 may further cooperate with the processors 144 to track and allocate the individual storage devices 160(1)-(N) to particular users 102 based on the users' requirements and needs while fulfilling the users' 102 storage capacity needs. For example, consider that a preexisting user 102 requests an additional quantum of storage capacity to meet his/her expanding data storage needs. The storage device management module 176 may determine which of the individual storage devices to allocate to the user 102 to meet his/her storage capacity requirements. Other factors that may be considered by the instructions stored in the storage device management module 176 and used for allocation of the individual storage devices 160(1)-(N) may include access times, seek times, data throughput rates, reliability, availability of non-fragmented continuous blocks, and the like. In one aspect, the storage device management module 176 may have instructions stored thereon to attempt to allocate storage capacity in a fashion where the allocation is as non-fragmented as possible among multiple users 102 of the remote computing servers 140. In another aspect, the storage device management module 176 may have instructions stored thereon to track changes to the allocation of storage capacity to different clients and users 102. In yet another aspect, the storage device management module 176 may have instructions stored thereon to prevent users from accessing storage capacity allocated to a different user or to otherwise prevent users from accessing storage capacity that they are not authorized to access.

The memory 170 may further include a storage device database module 178. The storage device database module 178 may have information stored thereon, related to individual storage devices 160(1)-(N), as well as clusters or bins of storage devices. With regard to individual storage device 160(1)-(N) information, the storage device database module 178 may have information regarding one or more of storage device age, storage device manufacturer, storage device serial number, storage device model type/number, storage device batch dates/numbers, storage device firmware versions, storage device interfaces, storage device AT Attachment (ATA) capabilities, storage device formats, number of read/write cycles, number of separate user allocations, etc., corresponding to one or more storage devices 160(1)-(N). In addition to identifier type information of the storage devices 160, as discussed, the storage device database module 178 may include measured data or metrics from individual storage devices 160(1)-(N). The measured data or metrics may be collected while storing data to the individual storage devices 160(1)-(N), while wiping or zeroing data to the individual storage devices 160(1)-(N), or while formatting the individual storage devices 160(1)-(N). The measured data or metrics may include mapping of bad or otherwise unusable blocks or sectors, measured seek times, measured data throughput rates, cyclic redundancy check (CRC) error rates, spin-up times, operating temperatures, or the like, of the individual storage devices 160(1)-(N). In certain embodiments, one or more of the storage devices 160(1)-(N) may be configured with self-monitoring and reporting technology (S.M.A.R.T.) to collect the measurements and metrics, as discussed. Therefore, the storage devices 160 themselves may, in certain embodiments, include hardware, software, and other infrastructure for self-health monitoring and reporting. The measured data may be collected, organized, and stored in the storage device database module 178 by the processors 144, the storage device drivers 150, or any other element of the remote computing servers 140.

It should further be noted that the storage device database module 178 may include information derived from collected data during one or more of storage device usage, storage device wiping, storage device wiping verification, or storage device formatting. An example of a derived metric may be a derivation of failed block erasure probability based on a partial scan verification of wiping of a particular storage device 160. In this case, it may be determined how many blocks have not been erased properly on the storage device based on a partial scan of the zeroed or wiped sectors. Based, at least in part, on the number of incorrectly wiped blocks and the percentage of all wiped blocks that were scanned, the processor may be able to determine a probability of improperly wiped blocks or generate an estimate of the total number of blocks that may have been improperly wiped on the storage device 160. These derived metrics, such as probabilities, probability density functions, projections, interpolations, extrapolations, and the like may be available and accessible by the processors 144 from the storage device database module 178. In this case, derived metrics may be associated with individual storage devices, clusters of storage devices, or both.

The storage device database module 178 may further include information pertaining to known deficiencies or defects of particular types of storage devices. For example, it may be known from publicly available information or from a manufacturer that a particular model of storage device exhibits premature failure or unreliable wiping or erasure. It will also be appreciated that the storage device database module 178 may be updated as new data becomes available. Contents of the storage device database module 178, including individual storage device measured metrics, aggregated metrics associated with a cluster of storage devices, storage device cluster related flags, or warnings or indications of unreliability, may be determined and updated in a real-time manner. Alternatively, the storage device related values and metrics may be updated at predetermined times or at predetermined frequencies, such as daily or weekly.

The remote computing servers 140 may further include a virtual block device driver 180 that is communicatively coupled to the processors 144 and configured to control and manage a virtual block device 190. The virtual block device 190 may, in one aspect, be configured to receive information related to blocks to which data is written on the storage devices 160. While the processors 144 or storage device drivers 150 write data to the storage devices 160, the signals sent to the storage devices 160 may also be sent to the virtual block device driver 180 and/or the virtual block device 190. Therefore, in certain aspects, the virtual block device 190 may be "slaved off of" the storage devices 160(1)-(N) associated with the storage capacity. Based on the signals sent to the virtual block device driver 180 and/or the virtual block device 190, the blocks on which data is written on the storage devices 160 may be ascertained. In one aspect, the data that is written to the storage devices 160 may not itself be copied to the virtual block device 190. Instead, an indication of the blocks of the storage devices 160 that were written to may be ascertained from the signals received by the virtual block device 190 and used to generate a mapping of written or dirtied blocks. In other words, the virtual block device 190 may itself have blocks that correspond to respective blocks of the storage devices 160, and these virtual block device blocks may be toggled to indicate if a particular corresponding block of the storage devices 160 has been dirtied. Therefore, the virtual block device 190 may have its own data storage elements, such as blocks or sectors, which can be written to or toggled to indicate if respective corresponding data storage elements of the storage devices 160 have data written thereon. In other cases, the data stored on the storage capacity and associated storage devices 160(1)-(N) may itself be mirrored on the virtual block device 190. It should be noted that in some cases, the virtual block device 190 may be a file stored in memory 170 and managed and generated by the virtual block device driver 180 and/or the processors 144.

In one aspect, the virtual block device 190 may slave off of the storage devices 160 to receive information, such as in the form of an electrical data signal, that is indicative of the blocks on the storage capacity and the associated storage devices 160(1)-(N) to which data is written. The signals may be utilized by the processors 144, the virtual block device drivers 180, and/or the virtual block device 190 to modify data elements on the virtual block device 190. The granularity of the data elements of the virtual block device 190 may be any suitable granularity to track the blocks of the storage device 160 to which data has been written. For example, the data element size of the virtual block device 190 may include bits, nibbles, bytes, blocks, sectors, or the like. Furthermore, the data elements of the virtual block device 190 may have any suitable correspondence to the data elements of the storage device 160. For example, a single bit on the storage devices 160 may correspond to a single bit on the virtual block device 190. Therefore if a single bit on the storage devices 160 is dirtied or has data written thereon, a corresponding respective bit on the virtual block device 190 may be indicative of that single bit having been dirtied. As another example, a block, or otherwise a collection of bits, of the storage devices 160 may correspond to a single respective bit of the virtual block device 190. Therefore, if any of the bits, or a predetermined number of bits of the block of the storage devices 160 is dirtied, then the corresponding single bit of the virtual block device 190 may be indicative of the dirtied block on the storage devices 160. In effect, the virtual block device 190 may provide a real-time, or near real-time, "book-keeping" of the blocks of the storage capacity and associated storage devices 160(1)-(N) that have been dirtied.

This information of dirtied blocks of the storage capacity and the associated storage devices 160 may be used by the virtual block device driver 180 and/or the virtual block device 190 to generate a mapping or indication of the dirtied or written blocks of the storage devices 160. In one aspect, the dirtied block mapping may be requested by the processors 144. The virtual block device 190, possibly in cooperation with the virtual block device driver 180, may generate the dirtied block mapping requested by the processors 144 responsive to receiving the dirtied block mapping request. The dirtied block mapping may be any suitable output of the virtual block device 190 that is indicative of the blocks of the storage devices 160, or portions thereof, which have been dirtied or written to. In certain embodiments, the dirtied block mapping may be an electronic table indicating portions, or blocks, of the storage devices 160 that have been dirtied. For example, a data bit corresponding to a data element, such as a bit or a block, of the storage devices 160, may be set to a predetermined value to indicate that the corresponding data element of the storage devices 160 has been dirtied.

The dirtied block mapping may be associated with all of the storage devices 160, individual storage devices 160(1)-(N), or one or more portions of individual storage devices 160(1)-(N). In some cases, more than one dirtied block mapping may be generated by the virtual block device 190 responsive to a single data mapping request. For example, the virtual block device 190 may generate dirtied block mappings corresponding to each individual storage device 160(1)-(N) or corresponding to portions of an individual storage device 160(1)-(N).

In one aspect, the virtual block device 190 may generate an individual mapping of blocks associated with each storage capacity or allocation that is provided by the remote computing servers 140 to users 102. In other words, each entity or user 102 may have a generated storage mapping of dirtied blocks associated therewith, while the entity or user 102 uses the storage capacity allocated to it. For example, if a first user is allocated a first storage capacity by the remote computing servers 140 from the storage devices 160 and a second user is allocated a second storage capacity from the storage devices 160, then the virtual block device 190 may generate an individual respective mapping of dirtied blocks corresponding to each of the first user and the second user, as the first and second users store data to their allocated storage capacity. In other embodiments, the virtual block device 190 may generate a unified or single mapping of dirtied or written blocks of the storage devices 160.

The coordination for tracking and/or generating the dirtied block mappings associated with various partitions of the storage devices 160 may be performed by the processors 144 in cooperation with the storage device management module 176 and/or the storage device database module 178. For example, the processors 144 may instantiate the generation of a dirtied block mapping by providing a request for the dirtied block mapping to the virtual block device driver 180 and/or the virtual block device 190. The request may include the individual storage devices 160(1)-(N), or portions or combinations thereof, that correspond to the storage capacity for which a dirtied block mapping is needed. To facilitate this dirtied block mapping request, the processors 144 may access and receive, from one or more of the storage device management modules 176 or the storage device database modules 178, information associated with mapping individual storage devices 160(1)-(N), or portions or combinations thereof, that correspond to a particular storage capacity.

In certain embodiments, the virtual block device 190 may discontinue slaving off of, or otherwise tracking, the used portions of a particular storage device 160(1)-(N) if that particular storage device 160(1)-(N) has been completely, or nearly completely, dirtied during use. In other words, the virtual block device 190 may stop tracking the dirtying of blocks of a particular storage device 160(1)-(N) when the particular storage device 160(1)-(N) has been substantially or fully dirtied. In other embodiments, the virtual block device 190 may stop slaving off of a particular storage capacity allocation if that particular storage capacity allocation and the storage devices 160(1)-(N), or portions thereof, have been substantially or fully dirtied. The determination that a particular storage device 160(1)-(N), a portion or collection thereof, or a particular storage capacity allocation has been fully or nearly fully dirtied may be made by the processors 144, the virtual block device driver 180, and/or the virtual block device 190. The virtual block device 190 may discontinue slaving off of a particular storage capacity or particular storage device 160(1)-(N), if that particular storage capacity or particular storage device 160(1)-(N) has been fully or nearly fully dirtied. In other words, the virtual block device 190 may stop receiving signals indicative of which blocks are being written to during use of the particular storage capacity or the particular storage device(s) 160(1)-(N). Therefore, the virtual block device 190 may discontinue tracking the dirtying of blocks of the storage capacity and/or associated storage devices 160(1)-(N). In other embodiments, the virtual block device 190 may continue to receive signals indicative of dirtied blocks associated with a storage capacity or storage devices(s) 160(1)-(N) for which tracking of dirtied blocks is no longer necessary However, the virtual block device 190 may ignore, or otherwise not perform any actions based upon the received signals.

In the same or further embodiments, the virtual block device 190 may be configured to continue tracking the dirtied blocks corresponding to one storage capacity allocation, while not tracking the dirtied blocks of another storage capacity allocation. In one aspect, the virtual block device 190 may be in the process of generating a mapping of dirtied blocks of a storage capacity allocation to one user 102, while tracking the usage and dirtying of blocks of another storage capacity allocation to another user 102. The virtual block device 190 may further be configured to track the dirtying of multiple storage devices and multiple allocated storage capacities contemporaneously.

Therefore, the virtual block device 190 may be slaved off of the storage devices 160 while the storage devices 160 are in use and data is written thereon. The slaving of the virtual block device 190 may be discontinued once substantially all of the blocks of a particular storage capacity or storage device 160(1)-(N) have been dirtied. Upon request, such as by the processors 144, the virtual block device 190 may provide a mapping of the blocks of the storage devices 160 that have been written to or dirtied. The processors 144 may use the dirtied block mapping for the purposes of wiping or verifying the wiping of one or more of the storage devices 160(1)-(N). In certain embodiments, the processors 144 may wipe storage devices associated with a particular storage capacity allocation and proceed with verifying the wiping of the wiped storage devices by only verifying the dirtied blocks, or a subset thereof. The dirtied blocks of the storage capacity and/or the storage devices may be determined from the dirtied block mapping that may be requested by the processors 144 from the virtual block device 190 prior to wiping and/or verifying the wiping of the storage capacity and/or the storage devices 160. In other embodiments, the processors 144 may only wipe the dirtied blocks based, at least in part, on the dirtied block mapping generated by the virtual block device 190 when requested by the processors 144.

In yet other embodiments, prior to wiping of a storage capacity and/or associated storage devices 160(1)-(N), a first dirtied block mapping may be generated by the virtual block device 190 based, at least in part, on tracking the dirtying of the storage capacity and/or the associated storage devices 160(1)-(N). The first dirtied block mapping may, therefore, correspond to the blocks of the storage capacity on which data has been written during use. The virtual block device 190 may then be erased or partially erased, where the erased portions correspond to data elements that map to the storage capacity and/or the associated storage devices 160(1)-(N) that are to be wiped. After wiping the relevant portions of the virtual block device 190, the processors 144 may wipe the storage capacity and/or the associated storage devices 160(1)-(N). During the wiping, the virtual block device 190, with its portions corresponding to the storage capacity and/or the associated storage devices 160(1)-(N), may be slaved off of the storage capacity and/or the associated storage devices 160(1)-(N). Therefore, the virtual block device 190 may, in effect, track which of the blocks of the storage capacity and/or the associated storage devices 160(1)-(N) are wiped during the wiping process initiated by the processors 144.

After the wiping of the storage capacity is completed, the processors 144 may again request a second dirtied block mapping associated with the storage capacity from the virtual block device 190. The second dirtied block mapping therefore corresponds to the blocks of the storage capacity that have been wiped. The processors 144 may, therefore, compare the first dirtied block mapping to the second dirtied block mapping to determine if all of the dirtied blocks, as indicated on the first dirtied block mapping, have been wiped. Therefore, the wiping of the storage capacity and/or the associated storage devices 160(1)-(N) may be verified based on the comparison of the first and second dirtied block mapping, as generated by the virtual block device 190. For example, the processors 144 may compare each of the blocks that have been dirtied according to the first dirtied block mapping to the wiping of the same blocks according to the second dirtied block mapping. If it is found that all of the dirtied blocks as indicated on the first dirtied block mapping correspond to the same wiped blocks from the second dirtied block mapping, then it may be deemed that the storage capacity and/or the associated storage devices 160(1)-(N) have been effectively wiped. However, if the dirtied blocks as indicated on the first dirtied block mapping do not correspond to the same wiped blocks from the second dirtied block mapping for at least one or more of the blocks of the storage capacity and/or the associated storage devices 160(1)-(N), then it may be deemed that the storage capacity and/or the associated storage devices 160(1)-(N) have not been effectively wiped. In certain embodiments, the processors 144 may re-wipe the storage capacity and/or associated storage devices 160(1)-(N), or portions thereof, if they have not been effectively wiped. In certain other embodiments, it may be determined that a storage capacity and/or associated storage devices 160(1)-(N) have been sufficiently wiped if the comparison between the first dirtied block mapping and the second dirtied block mapping indicate that the number of blocks of the storage capacity and/or the associated storage devices 160(1)-(N) is below a predetermined threshold. The predetermined threshold may be a predetermined percentage of all of the blocks of the storage capacity or a fixed number of blocks.

It will be appreciated that while a single virtual block device 190 is depicted for mapping the storage devices 160, in certain embodiments, more than one virtual block device 190 may be used for mapping the data written to the storage devices. Indeed, in certain embodiments, each storage device 160(1)-(N) may have a virtual block device associated therewith to map the data written to that particular storage device 160(1)-(N).

Illustrative Processes

Figure 2:
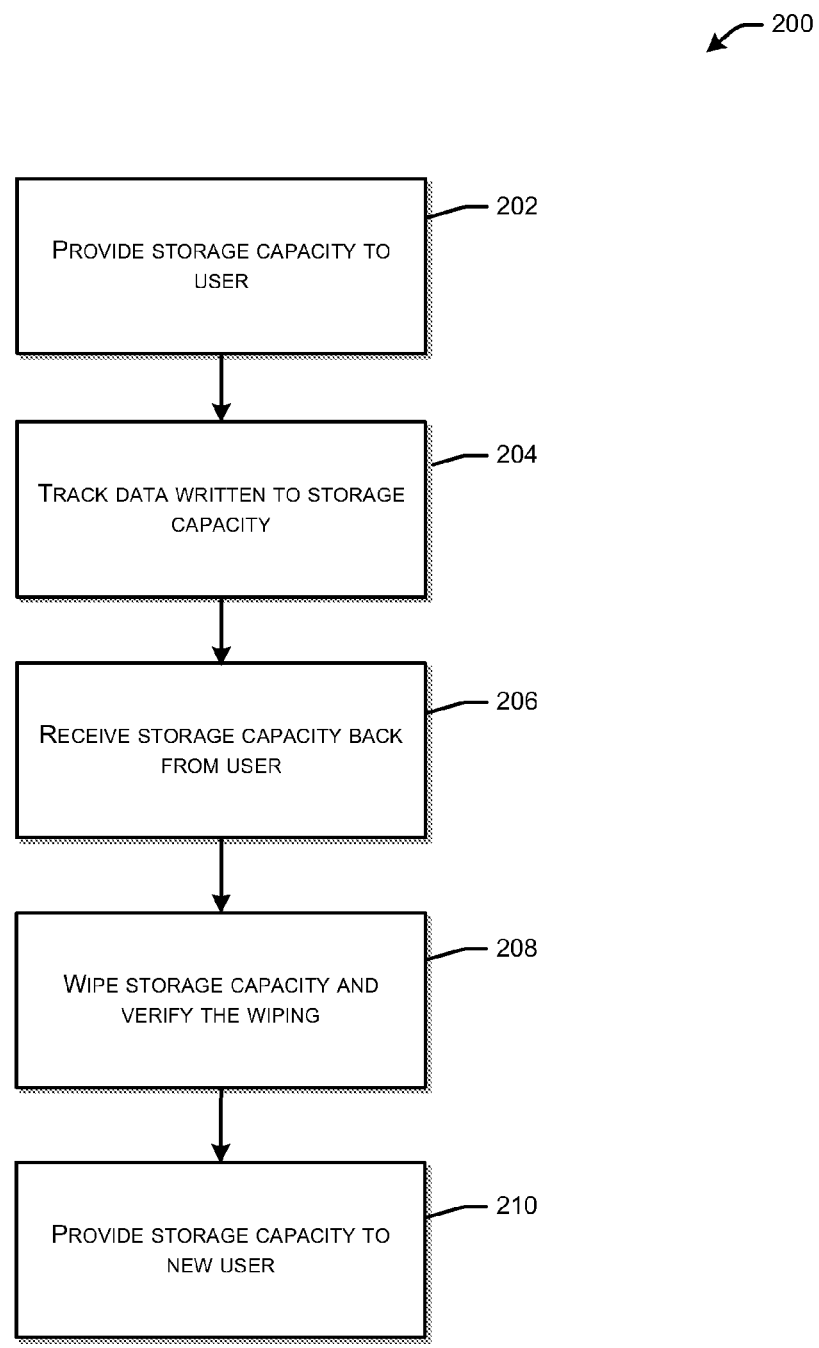
FIG. 2 is a flow diagram illustrating an example method for providing storage capacity to a user, in accordance with embodiments of the disclosure.

Referring now to FIG. 2, an example method 200 for providing storage capacity to a user illustrated. This method 200 may be implemented by the remote computing servers 140. At block 202, storage capacity may initially be provided to a user. In other words, a virtual machine instance 142 with associated computing resources and/or data storage resources may be provided by the remote computing servers 140 to the user. The user may selectively store data on some or all of the provided storage capacity. Therefore, some or all of the blocks associated with the storage capacity allocated to the user may have data written thereon. In one aspect, when the storage capacity is provided to the user, the storage devices 160 are located along with the remote computing servers 140 and, therefore, the storage capacity is provided at a remote location from the user devices 104. The storage capacity allocated to a particular user may be allocated from just one storage device, a portion of one storage device, more than one storage device, portions of more than one storage device, one or more storage devices, one or more portions of storage devices, or any suitable combinations of whole and partial storage devices. In one aspect, the storage device management module 176 and instructions stored thereon may be executed by the processors 144 to allocate, track, and manage the storage devices 160, or portions thereof, which constitute the storage capacity that is allocated to the user. In certain embodiments, the storage capacity allocated to the user may be borrowed, rented, leased, or purchased from a provider of remote computing services. The provider of the remote computing services may be an individual or an entity that owns, operates, rents, leases, or otherwise controls the remote computing servers 140.

At block 204, the data written to the storage capacity that was provided to the user may be tracked. The tracking may, in one aspect, be performed by slaving the virtual block device 190 off of the storage devices 160(1)-(N) associated with the storage capacity. Therefore, as the user writes data to the storage capacity, the virtual block device 190 may receive the same signals that are received by the storage devices 160(1)-(N) associated with the storage capacity or related corresponding signals. Based on the signals received by the virtual block device 190, the virtual block device 190, in some cases in cooperation with at least one of the processors 144 or the virtual block device driver 180, may toggle one or more data elements of the virtual block device 190 corresponding to data elements, such as blocks, to which data from the user is written to storage capacity. In effect, by doing so, the virtual block device 190 may track which of the blocks of the storage capacity have been written to or dirtied.

At block 206, the storage capacity that was provided to the user may be received back from the user. In other words, the storage capacity that was allocated to the user in block 202 is no longer need by the user and, therefore, is returned to the provider. Therefore, the virtual machine instance 142 may be terminated for the user by the remote computing servers 140. In some embodiments, the user may no longer borrow, rent, lease, purchase, or otherwise control the storage capacity that it returns and no longer uses. In certain embodiments, the user may provide an indication that the user is returning the storage capacity to the provider of remote computing services and back to the remote computing servers 140. Once the storage capacity is received back or an indication is received that storage capacity is being returned to the remote computing servers 140, the storage capacity may be prepared for provision to another user. At this point, some or all of the storage capacity may have been written to and may be dirtied with data from usage by the user to which the storage capacity was provided. In other words, one or more blocks of the storage capacity may be dirtied or may contain data thereon. It should also be noted that the dirtied blocks may reside on one or more individual storage devices 160(1)-(N). It should also be noted that if the storage capacity is spread across more than one storage device 160(1)-(N), the storage devices 160 may be of similar types or dissimilar types. It should also be noted that at this point, as a result of tracking the blocks to which data was written on the storage capacity at block 204, the virtual block device 190 may have a complete record of which blocks of the storage capacity have been dirtied during use by the user 102.

At block 208, the storage capacity may be wiped, and the wiping may be verified. In one aspect, the wiping may be performed by the processors 144. In certain embodiments, the wiping may entail wiping all of the blocks of the storage capacity and the associated storage devices 160(1)-(N). In certain other embodiments, the wiping may entail wiping only the blocks that have been dirtied. In one aspect, the blocks that have been dirtied may be ascertained from a dirtied block mapping corresponding to the storage capacity and the associated storage devices 160(1)-(N), as generated by the virtual block device 190. The processors 144 may request the dirtied block mapping corresponding to the storage capacity from the virtual block device 190 for the purpose of wiping the storage capacity and associated storage devices 160(1)-(N).

Regardless of whether all of the blocks or only the dirtied blocks of the storage capacity and associated storage devices 160(1)-(N) have been wiped, in certain embodiments, only the dirtied blocks may be verified for wiping. In other words, the verification to determine if the dirtied blocks of the storage capacity and associated storage devices 160(1)-(N) have been sufficiently wiped may entail only verifying the wiping of some or all of the storage capacity blocks that were dirtied during usage by the user 102. In other words, the non-dirtied blocks of the storage capacity, or the blocks that did not have data stored thereon during usage, may not be verified for wiping. The processors 144 may request the dirtied block mapping corresponding to the storage capacity from the virtual block device 190 for the purpose of verifying the wiping of the storage capacity and associated storage devices 160(1)-(N).

In certain other embodiments, verifying whether the storage capacity has been sufficiently wiped may entail generating a first dirtied block mapping associated with the storage capacity prior to wiping the storage capacity and associated storage devices 160(1)-(N) and then slaving the virtual block device 190 off of the storage capacity and associated storage devices 160(1)-(N) during the wiping process. In one aspect, the virtual block device 190 may be wiped, erased, or zeroed, after generating the dirtied block mapping and prior to wiping the storage capacity. Therefore, during the wiping of the storage capacity, the virtual block device 190 may track which of the blocks have been wiped. In certain aspects, the wiping of the blocks of the storage capacity and associated storage devices 160(1)-(N) may entail writing a logic zero to each of the bits of that block. After the wiping of the storage capacity and associated storage devices 160(1)-(N) is completed, the processors 144 may request a second dirtied block mapping of the storage capacity and the associated storage devices 160(1)-(N) from the virtual block device 190. In this case, the second dirtied block mapping may correspond to the blocks of the storage capacity and associated storage devices 160(1)-(N) that have been wiped during the wiping process. The processors 144 may further compare the first and the second dirtied block mapping, such as in a block-by-block manner, to verify the wiping of the storage capacity and the associated storage devices 160(1)-(N).

Once the storage capacity has been wiped and the wiping has been verified, the method 200 may proceed to block 210, where the storage capacity may be provided to a new user. In other words, a virtual machine instance 142 may be offered to a new user by the remote computing servers 140. The storage capacity associated with the new instance 142 may be a storage capacity that has been wiped and verified after usage in a previous instance 142. By wiping and verifying the wiping of the storage capacity, data confidentiality and data security of the first user is ensured while providing the previously used storage capacity to a new user.

It will be appreciated that although the methods as shown herein are discussed in the context of remote computing or cloud computing services, the methods for erasing storage devices may be applied in any suitable application other than remote computing services. In certain embodiments, the methods described herein may be used to wipe storage devices that are not at remote locations. In fact, the method 200 may be applied to a personal computer or otherwise non-remote computing application and setting.

Figure 3:
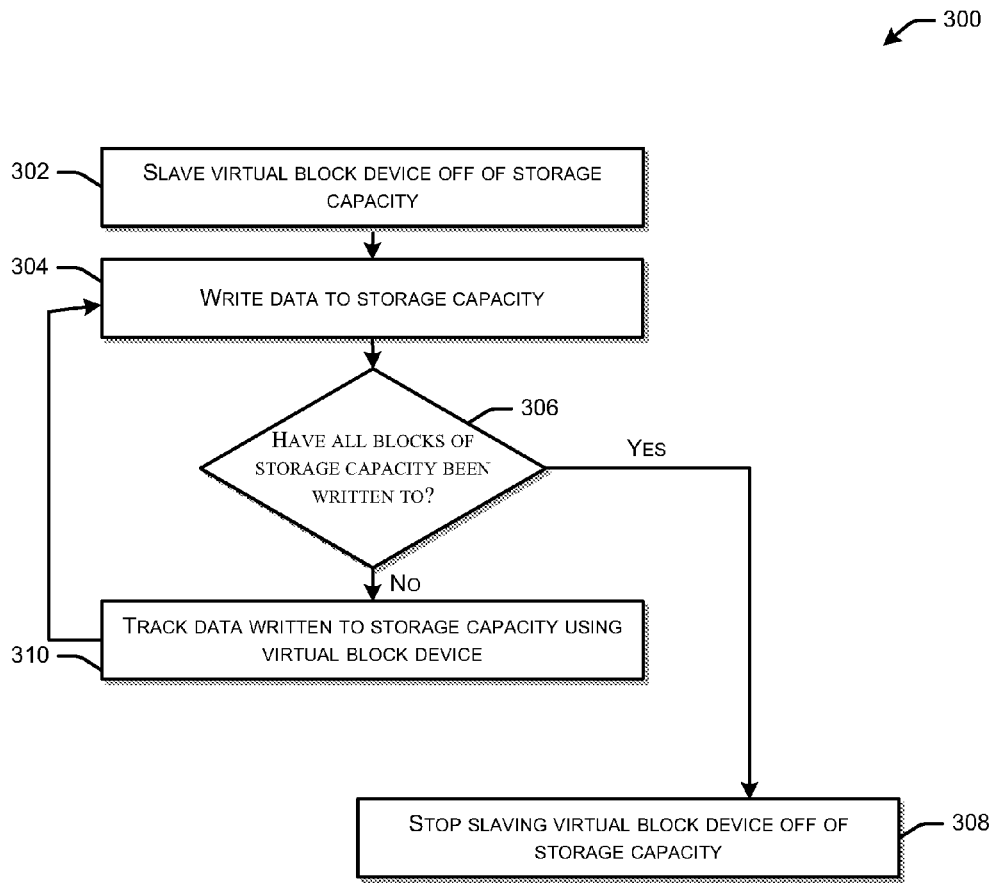
FIG. 3 is a flow diagram illustrating an example method for tracking data written to the storage capacity using a virtual block device, in accordance with embodiments of the disclosure.

Referring now to FIG. 3, an example method 300 for tracking the data written to the storage capacity and storage devices 160(1)-(N) associated therewith using a virtual block device. The method 300 may be performed by the remote computing servers 140, and the method 300 may be an example implementation of block 204 of the method 200 of FIG. 2. At block 302, the virtual block device 190 may be slaved off of the storage capacity. Therefore, in one aspect, the signals that are received by the storage devices 160(1)-(N) associated with the storage capacity, or related signals, may be received by the virtual block device 190 and/or the virtual block device driver 180. For example, if the processors 144 send a segment of data to be written to the storage capacity, then the data may be received by the storage device drivers 150, and the storage device drivers 150 may further cooperate with the processors to write the segment of data to one or more of the storage devices 160(1)-(N) corresponding to the storage capacity. The data, or an indication thereof, may also be sent to the virtual block device 190 by one of either the processors 144 or the storage device drivers 150. Therefore, in this case, the virtual block device 190 receives the same or similar signals as the one or more storage devices 160(1)-(N) associated with the storage capacity and as a result slaves off of the storage devices 160(1)-(N).

At block 304, data may be written to the storage capacity and the storage devices 160(1)-(N) associated therewith. This may occur while the remote computing resources and remote data storage services are provided to users 102 by the remote computing servers 140. The user 102 may want to save data to the storage capacity allocated to the user and the associated storage devices 160(1)-(N). The data may be any suitable type of data including, but not limited to, applications, programs, scripts, media, data files, or the like. In one aspect, the data to be stored may be generated at the remote computing servers 140. Alternatively, the data to be stored may be generated at the user device 104 and communicated to the remote computing servers 140 via the network 108.

At block 306, it may be determined if all or substantially all of the blocks of the storage capacity have been dirtied. This can be determined by, for example, checking the data elements of the virtual block device 190 to determine if all or nearly all of the data elements corresponding to the storage capacity are indicative of dirtying. In certain embodiments a dirtied block mapping associated with the storage capacity may be requested by the processors 144 to make the determination of whether all or substantially all of the blocks of the storage capacity and associated storage devices 160(1)-(N) have been dirtied. If it is determined that all, or substantially all, of the blocks of the storage capacity have been dirtied, then at block 308, slaving the virtual block device 190 off of the storage capacity may be discontinued. Indeed, if the virtual block device 190 indicates that all of the blocks of the storage capacity have been dirtied, then continuing to track the blocks to which data is written on the storage capacity may not be useful. This may especially be the case if data is saved over previously dirtied blocks of the storage capacity during the usage of the storage capacity and the associated storage devices 160(1)-(N) by the user 102. Therefore, if the storage capacity has been fully or nearly fully dirtied, then by discontinuing the slaving of the virtual block device 190 off of the storage capacity, computing resource deployment, energy, and equipment deployment/utilization may be reduced or saved.

At block 306, if it is determined that the storage capacity is not fully or nearly fully dirtied, then at block 310, the virtual block device 190 may track the blocks to which data is written on the storage capacity. In one aspect, data elements, such as bits or blocks, on the virtual block device 190 may correspond to data elements of the storage capacity, such as bits and blocks. In some cases, the correspondence between data elements on the virtual block device 190 and the storage capacity may be one-to-one, where the corresponding respective data elements on the virtual block device 190 and the storage capacity may be the same size. For example, a block on the storage capacity may correspond to a block of data on the virtual block device 190. In other embodiments, there may not be a one-to-one correspondence between a data element on the storage capacity and the respective corresponding virtual block device 190. For example, a block that includes a plurality of bits on the storage device may correspond to a respective single bit on the virtual block device 190. In other words, toggling of the single bit on the virtual block device 190 may indicate that the corresponding block of the storage capacity and associated storage devices 160(1)-(N) have been dirtied. It should be noted that in some cases, the virtual block device 190 may be a file stored in memory 170 and managed and generated by the virtual block device driver 180 and/or the processors 144. In one aspect, the virtual block device 190 may be instantiated by the processors 144, running the operating module system 172 and cooperating with the virtual block device driver 180. In some embodiments, there may be a virtual block device 190 corresponding to each of the storage devices 160(1)-(N).

It should be noted that the method 300 may be modified in various ways in accordance with certain embodiments. For example, one or more operations of the method 300 may be eliminated or executed out of order in other embodiments. Additionally, other operations may be added to the method 300 in accordance with other embodiments.

Figure 4:
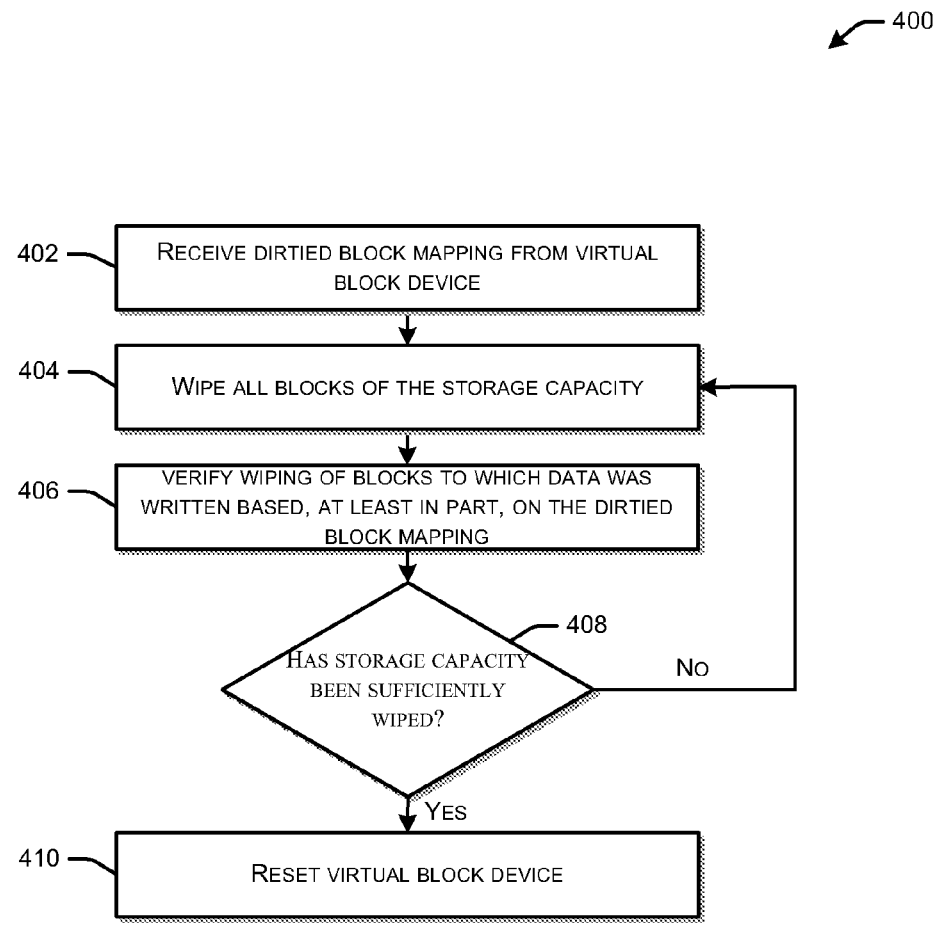
FIG. 4 is a flow diagram illustrating an example method for wiping all of the blocks of the storage capacity and verifying the wiping of the dirtied blocks of the storage capacity, in accordance with embodiments of the disclosure.

Referring now to FIG. 4 an example method 400 for wiping and verifying the wiping of the storage capacity is illustrated. The method 400 may be executed by the remote computing servers 140. The method 400 may be an example implementation of block 208 of method 200, as depicted in FIG. 2. At block 402, the dirtied block mapping associated with a storage capacity may be received from the virtual block device 190. In one aspect, the dirtied block mapping may be a data file that maps the blocks that have been written to on the storage capacity and associated storage devices 160(1)-(N) during the usage of the storage devices 160(1)-(N). The data file may be received by the processors 144 and may subsequently be stored on the memory 170. In certain embodiments, the dirtied block mapping associated with the storage capacity may be received responsive to a request for the dirtied block mapping. In one aspect, the dirtied block mapping request may be generated by the processors 144 and provided to the virtual block device 190 and/or the virtual block device driver 180.

At block 404, all of the blocks of the storage capacity may be wiped. In certain embodiments, the wiping of the storage capacity and associated storage devices 160(1)-(N) may entail writing logic zeros to the bits of the storage capacity. In this case, the processors 144 may control and/or manage the wiping of the storage capacity and the associated storage devices 160(1)-(N).

At block 406, the wiping of the storage capacity may be verified based, at least in part, on the dirtied block mapping. In one aspect, the verification may be performed by the processors 144. The dirtied blocks of the storage capacity, or a subset thereof, may be scanned to determine if the blocks have been wiped. Therefore, the verification may generate a tally of how many blocks were wiped properly, how many blocks were not properly wiped, and/or a percentage of blocks of the storage capacity that were not properly wiped. The processors 144 may determine which of the blocks of the storage capacity to scan based, at least in part, on the dirtied block mapping and then direct the storage devices 160 via the storage device drivers 150 to scan the blocks of interest and provide an output based thereon to the processors 144 that can be evaluated to determine if those blocks were properly wiped.

In certain embodiments, the verification may scan only a subset of all of the dirtied blocks of a particular storage device 160. The subset of the blocks of the storage device that are scanned during the partial scanning may be a predetermined percentage of the total number of blocks of the storage device. Alternatively, the subset of the blocks that are scanned may be a predetermined number of blocks. The distribution of the subset of blocks selected for the partial scan may be according to a predetermined template. For example, the distribution may be according to any suitable distribution function or sequence, such as, for example, a Fibonacci type pattern. Alternatively, the distribution of the subset of blocks that are scanned may be determined in-situ while conducting the partial scan by one or more of a random process with memory, a memoryless random process, a random walk, a Markov process, a Monte Carlo process, or combinations thereof.

At block 408, it may be determined if the storage capacity and associated storage devices 160(1)-(N) have been sufficiently wiped. In this case, the verification metrics related to the number of properly or improperly wiped blocks of the storage capacity, as determined at block 406, may be compared to threshold conditions. Therefore, the storage capacity may be deemed to be sufficiently wiped if the total number or total percentage of improperly wiped blocks of the storage capacity and associated storage devices 160(1)-(N) is below a respective predetermined threshold upper limit.

If at block 408 it is determined that the storage capacity and associated storage devices 160(1)-(N) have not been sufficiently wiped, then the method 400 may return to block 404 to again wipe the storage capacity. Alternatively, only a subset, such as a particular storage device 160(1)-(N), a portion of a particular storage device 160(1)-(N), or identified blocks that were not properly wiped, may be re-wiped, if the storage capacity is deemed to be not sufficiently wiped at block 408. In other words, not all of the blocks of the storage capacity may need to be re-wiped if the storage capacity is not sufficiently wiped and, therefore, only a subset of the blocks of the storage capacity may be re-wiped. At block 408, if the storage capacity is deemed to be sufficiently wiped, then at block 410, the virtual block device 190 may be reset. In one aspect, this may include erase any tracking files that may be generated by the virtual block driver 190. As a result, the virtual block device 190 may again be ready to be slaved off of the storage capacity or individual storage devices 160(1)-(N) to track the dirtying of the blocks of the storage devices.

It will be appreciated that during the wiping and/or the verification stages at blocks 404 and 406, metrics may be collected on the storage devices 160(1)-(N) associated with the storage capacity. These metrics may include access times, scan times, data throughput rates, or bad blocks/sectors, or any other suitable metric associated with storage devices. If the metrics provide indications or symptoms of ill health of the storage devices 160(1)-(N), such as by showing metric values that are outside of pre-established specifications, then particular storage devices 160(1)-(N) may be further inspected, repaired, reconfigured, monitored, and/or disposed of.

It will further be appreciated that in certain embodiments, the process of verifying if a storage device has been properly wiped may be relatively time-consuming or may require relatively high levels of computing resources. Accordingly, if the wiping verification process can be reduced to only scanning the dirtied blocks of the storage device, or a subset thereof, based on an analysis of whether the storage device has been sufficiently wiped, then the verification process may require relatively less time and/or relatively less computing resources.

It should be noted that the method 400 may be modified in various ways in accordance with certain embodiments. For example, one or more operations of the method 400 may be eliminated or executed out of order in other embodiments. Additionally, other operations may be added to the method 400 in accordance with other embodiments.

Figure 5:
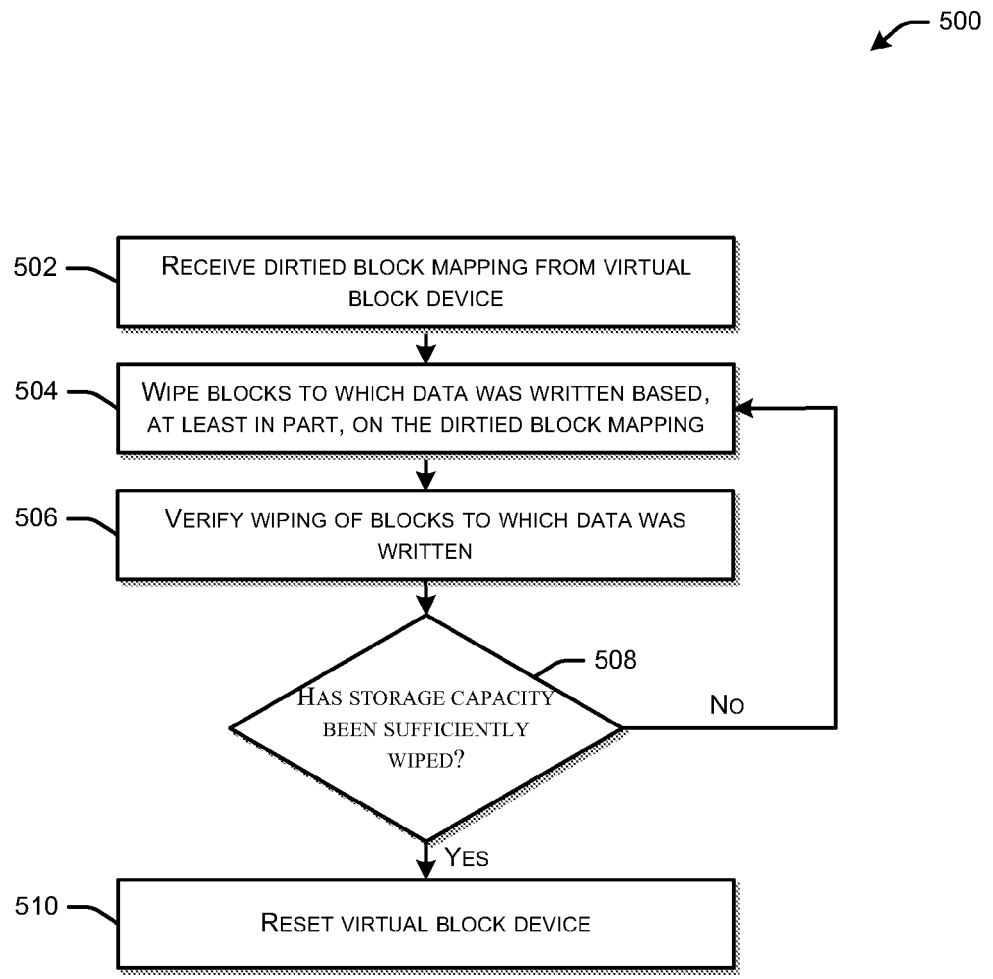
FIG. 5 is a flow diagram illustrating an example method for wiping and verifying the wiping of dirtied blocks of the storage capacity, in accordance with embodiments of the disclosure.

Referring now to FIG. 5, another example method 500 for wiping and verifying the wiping of the dirtied blocks of the storage capacity is illustrated. The method 500 may be executed by the remote computing servers 140. The method 500 may be an example implementation of block 208 of the method 200, as depicted in FIG. 2. The method 500 differs from method 400 in that the wiping of the storage capacity is performed only on the blocks that have been dirtied. At block 502, the dirtied block mapping associated with a storage capacity may be received from the virtual block device 190. In one aspect, the dirtied block mapping may be a data file that maps the blocks that have been written to on the storage capacity and associated storage devices 160(1)-(N) during the usage of the storage devices 160(1)-(N). In certain embodiments, the dirtied block mapping associated with the storage capacity may be received responsive to a request for the dirtied block mapping. In one aspect, the dirtied block mapping request may be generated by the processors 144 and provided to the virtual block device 190 and/or the virtual block device driver 180.

At block 504, the blocks of the storage capacity that have been dirtied or written to during use may be wiped based, at least in part, on the dirtied block mapping. In certain embodiments, the wiping of the storage capacity and associated storage devices 160(1)-(N) may entail writing logic zeros to the bits or blocks that were dirtied on the storage capacity and associated storage devices 160(1)-(N). The processors 144 may control and/or manage the wiping of the storage capacity and associated storage devices 160(1)-(N). In one aspect, the processors 144 may analyze the dirtied block mapping and based, at least in part, thereon, determine the blocks of the storage capacity and associated storage devices 160(1)-(N) that have been dirtied. The processors 144 may then direct the wiping of those blocks that were determined to be dirtied. By only wiping the blocks that were dirtied, the wiping process may be faster and may consume fewer computing and energy resources.

At block 506, the wiping of the storage capacity may be verified based, at least in part, on the dirtied block mapping. In one aspect, the verification may be performed by the processors 144. The dirtied blocks of the storage capacity, or a subset thereof, may be scanned to determine if the blocks have been wiped. The verification may generate a tally of how many blocks were wiped properly, how many blocks were not properly wiped, and/or a percentage of blocks of the storage capacity that were not properly wiped. The processors 144 may determine which of the blocks of the storage capacity to scan based, at least in part, on the dirtied block mapping and then direct the storage devices 160 via the storage device drivers 150 to scan the blocks of interest and provide an output based thereon to the processors 144 that can be evaluated to determine if those blocks were properly wiped.

At block 508, it may be determined if the storage capacity and associated storage devices 160(1)-(N) have been sufficiently wiped. In this case, the verification metrics related to the number of properly or improperly wiped blocks of the storage capacity, as determined at block 506, may be compared to threshold conditions. Therefore, the storage capacity may be deemed to be sufficiently wiped if the total number or total percentage of improperly wiped blocks of the storage capacity and associated storage devices 160(1)-(N) is below a respective predetermined threshold upper limit.

If at block 508 it is determined that the storage capacity and associated storage devices 160(1)-(N) have not been sufficiently wiped, then the method 500 may return to block 504 to again wipe the storage capacity. Alternatively, only a subset, such as a particular storage device 160(1)-(N), a portion of a particular storage device 160(1)-(N), or identified blocks that were not properly wiped, may be re-wiped, if the storage capacity is deemed to be not sufficiently wiped at block 508. At block 508, if the storage capacity is deemed to be sufficiently wiped, then at block 510, the virtual block device 190 may be reset. As a result, the virtual block device 190 may again be ready to be slaved off of the storage capacity or individual storage devices 160(1)-(N) to track the dirtying of the blocks of the storage devices.

Figure 6:
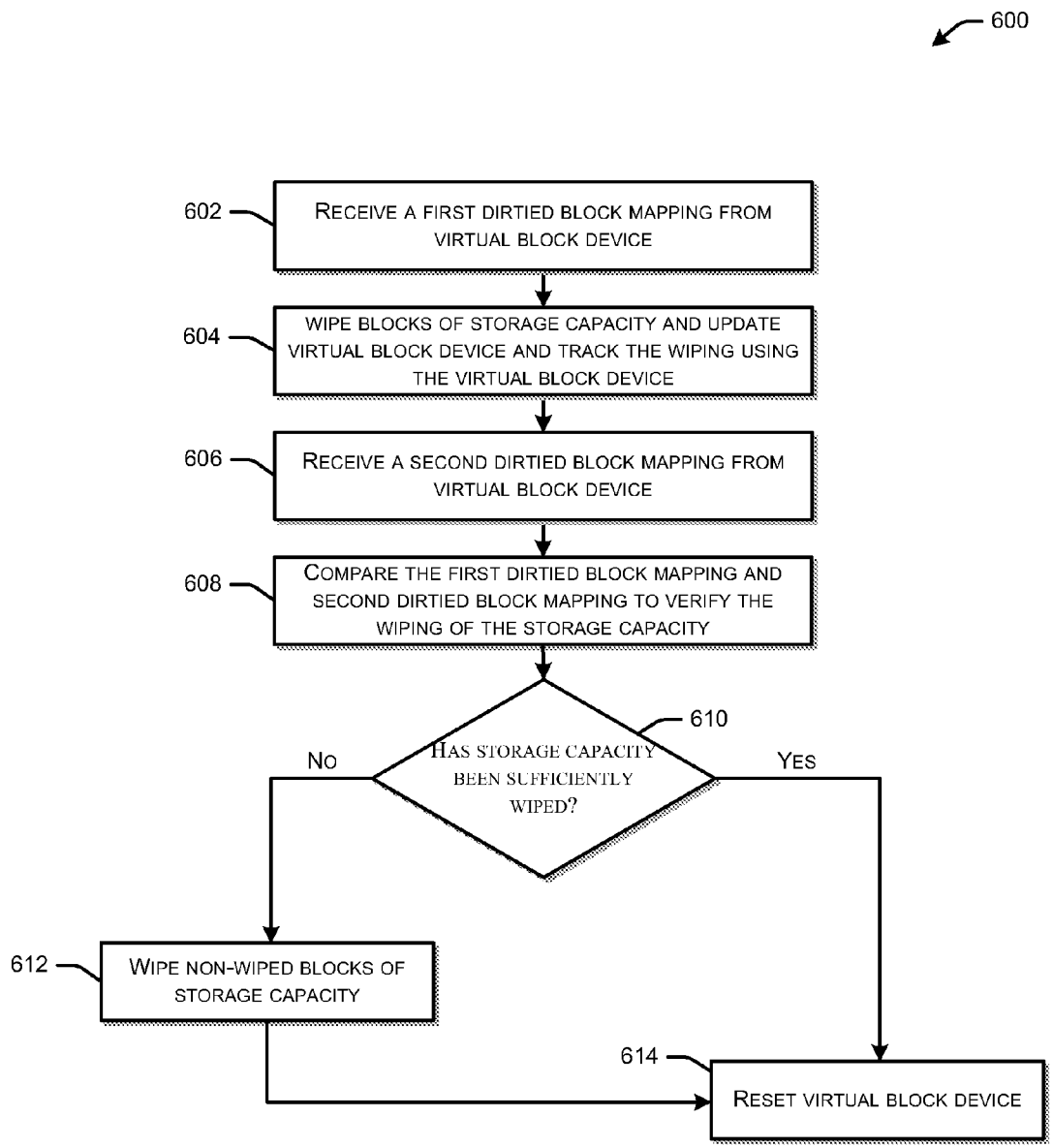
FIG. 6 is a flow diagram illustrating an example method for wiping and verifying the wiping of a storage capacity by generating two dirtied block mappings of the storage capacity using a virtual block device, in accordance with embodiments of the disclosure.

Referring now to FIG. 6, yet another example method 600 for wiping and verifying the wiping of the storage capacity by generating two dirtied block mappings of the storage capacity using a virtual block device is illustrated. The method 600 may be executed by the remote computing servers 140. The method 600 may be an example implementation of block 208 of the method 200, as depicted in FIG. 2. At block 602, a first dirtied block mapping may be received from the virtual block device 190. The first dirtied block mapping may be generated by the virtual block device 190 responsive to a dirtied block mapping request generated by the processors 144 and provided to the virtual block device 190. The dirtied block mapping may be based, at least in part, on tracking the dirtying of the storage capacity and the associated storage devices 160(1)-(N) by the virtual block device, such as at block 204 of the method 200, as depicted in FIG. 2. The first dirtied block mapping may, therefore, correspond to the blocks of the storage capacity on which data has been written during use.

At block 604, the blocks of the storage capacity may be wiped while tracking the wiping using the virtual block device 190. In other words, the virtual block device 190 may slave off of the storage capacity while the storage capacity and associated storage devices 160(1)-(N) are wiped. In certain embodiments, the virtual block device 190 may then be reset, erased, and/or partially erased prior to slaving off of the storage capacity during wiping, where the erased portions correspond to data elements that map to the storage capacity and the associated storage devices 160(1)-(N) that are to be wiped. After wiping the relevant portions of the virtual block device 190, the processors 144 may wipe the storage capacity and the associated storage devices 160(1)-(N), and the virtual block device 190 may track in real-time or near real-time, the blocks of the storage capacity that are being wiped. Therefore, when the wiping of the storage capacity is complete, the virtual block device 190 may, in effect, have a record of which of the blocks of the storage capacity and the associated storage devices 160(1)-(N) were wiped during the wiping process initiated by the processors 144.

After the wiping of the storage capacity is completed, at block 606, the processors 144 may receive a second dirtied block mapping associated with the storage capacity. Receiving the second dirtied block mapping by the processors 144 from the virtual block device 190 may be responsive to a request for a dirtied block mapping associated with the storage capacity generated by the processors 144 and provided to the virtual block device 190. The second dirtied block mapping may correspond to the blocks of the storage capacity that have been wiped.

At block 608, the first dirtied block mapping and the second dirtied block mapping may be compared to verify if all of the dirtied blocks of the storage capacity have been wiped. Therefore, the verification of the wiping of the storage capacity and/or the associated storage devices 160(1)-(N) may be a block-by-block comparison of the first and the second dirtied block mapping to identify the blocks that are indicated to be dirtied in the first dirtied block mapping and are not indicated to be wiped in the second dirtied block mapping. For example, the processors 144 may compare each of the blocks that have been dirtied according to the first dirtied block mapping to the wiping of the same blocks according to the second dirtied block mapping. In certain embodiments, the total number or percentage of insufficiently wiped blocks of the storage capacity may be determined.

At block 610, it may be determined if the storage capacity has been sufficiently wiped. If it is found that all of the dirtied blocks as indicated on the first dirtied block mapping correspond to the same wiped blocks from the second dirtied block mapping, then it may be deemed that the storage capacity and/or the associated storage devices 160(1)-(N) have been sufficiently wiped. If however, the dirtied blocks as indicated on the first dirtied block mapping do not correspond to the same wiped blocks from the second dirtied block mapping for at least one or more of the blocks of the storage capacity and/or the associated storage devices 160(1)-(N), then it may be deemed that the storage capacity and/or the associated storage devices 160(1)-(N) have not been sufficiently wiped. In certain embodiments, the storage capacity may be deemed to be sufficiently wiped if the total number or total percentage of improperly wiped blocks of the storage capacity and associated storage devices 160(1)-(N) is below a respective predetermined threshold upper limit.

If at block 610 it is determined that the storage capacity has not been sufficiently wiped, then at block 612 the non-wiped blocks of the storage capacity may be wiped. In other words, portions of the storage capacity and associated storage devices 160(1)-(N) may be re-wiped. The non-wiped blocks of the storage capacity may be determined by the processors 144 by comparing the first and second dirtied block mapping. In certain other embodiments, all of the blocks of the storage capacity may be re-wiped, rather than wiping only the non-wiped blocks.

After wiping the non-wiped blocks the method 600 may proceed to block 614, where the virtual block device 190 may be reset. At block 610, if it is determined that the storage capacity is sufficiently wiped, then the method 600 may proceed directly to block 614. Upon erasing, the virtual block device 190 may again be ready to be slaved off of the storage capacity or individual storage devices 160(1)-(N) to track the dirtying of the blocks of the storage devices.

Figure 7:
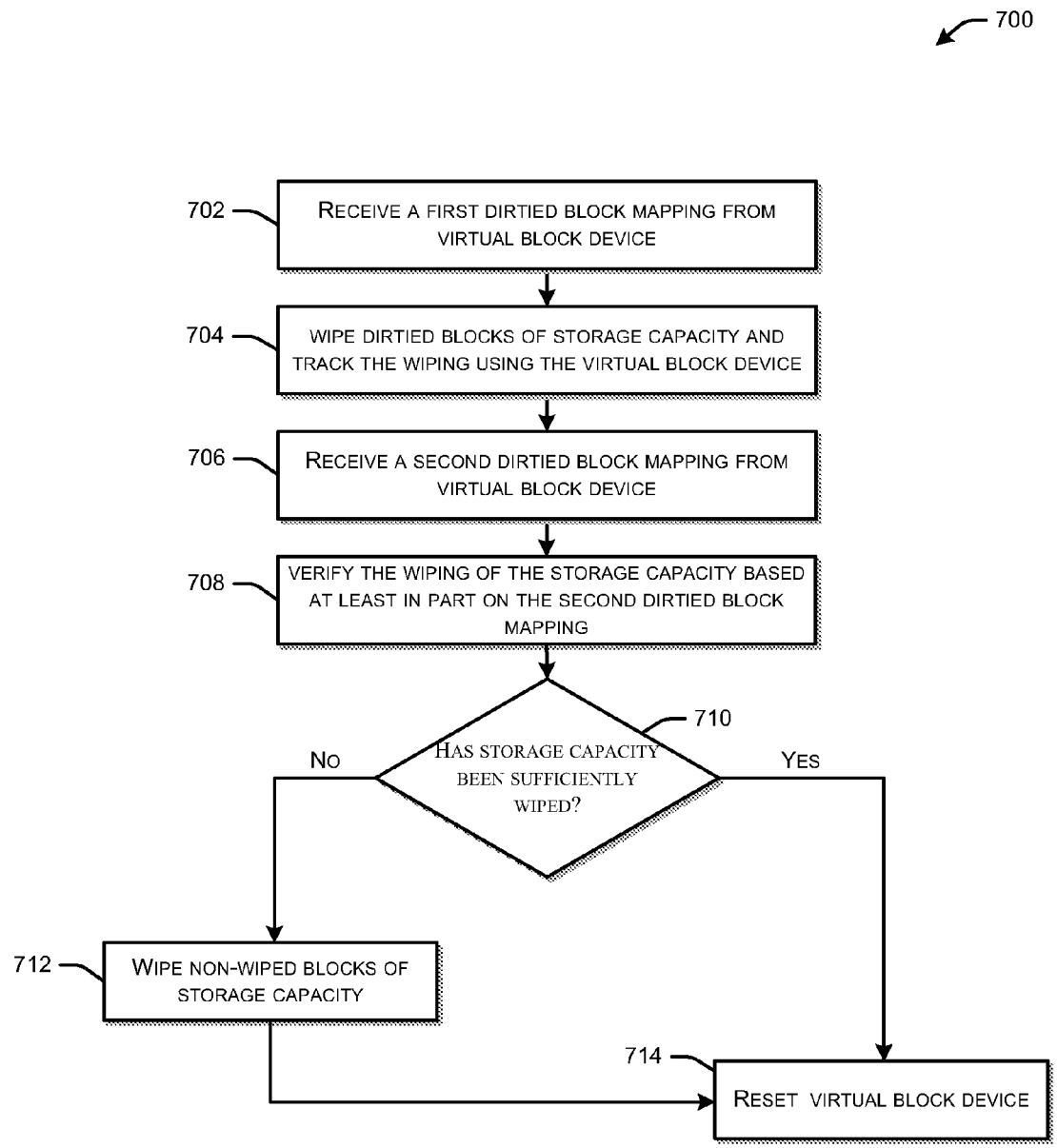
FIG. 7 is a flow diagram illustrating an example method for wiping and verifying the wiping of a storage capacity by generating a dirtied block mapping that is indicative of the wiping of the storage capacity using a virtual block device, in accordance with embodiments of the disclosure.

Referring now to FIG. 7, yet another example method 700 for wiping and verifying the wiping of the storage capacity by generating two dirtied block mappings of the storage capacity using a virtual block device is illustrated. The method 700 may be executed by the remote computing servers 140. The method 700 may be an example implementation of block 208 of the method 200, as depicted in FIG. 2. At block 702, a first dirtied block mapping may be received from the virtual block device 190. The first dirtied block mapping may be generated by the virtual block device 190 responsive to a dirtied block mapping request generated by the processors 144 and provided to the virtual block device 190. The dirtied block mapping may be based, at least in part, on tracking the dirtying of the storage capacity and the associated storage devices 160(1)-(N) by the virtual block device, such as at block 204 of the method 200, as depicted in FIG. 2. In one aspect, as the remote computing servers 140 provide computing and/or storage capacity to users 102 as instances 142 running thereon, the virtual block device 190 may track the usage of the storage capacity by the user 102. The first dirtied block mapping may, therefore, correspond to the blocks of the storage capacity on which data has been written during use.

At block 704, the blocks of the storage capacity may be wiped while tracking the wiping using the virtual block device 190. In other words, the virtual block device 190 may slave off of the storage capacity while the storage capacity and associated storage devices 160(1)-(N) are wiped. In certain embodiments, only the dirtied blocks of the storage capacity and the associated storage devices 160(1)-(N) as determined by the first dirtied block mapping are wiped. As the storage capacity and the associated storage devices 160(1)-(N) are wiped, the virtual block device 190 may track in real-time or near real-time, the blocks of the storage capacity that are being wiped. In one aspect, the blocks that are wiped, may be set to a particular indicator of the same, such as a logic zero, to indicate the wiping. Therefore, when the wiping of the storage capacity is complete, the virtual block device 190 may, in effect, have a record of which of the blocks of the storage capacity and the associated storage devices 160(1)-(N) were wiped during the wiping process initiated by the processors 144. This tracking may be performed using the initial tracking file of the dirtied blocks, where a particular dirtied block is shown as being wiped once the wiping is performed on that block. Therefore, a data element on the tracking file of the virtual block device 190 may be set to a logic "1" when the corresponding block of the storage capacity is dirtied during use. Subsequently, the same data element may be set to a logic "0" when the corresponding block of the storage capacity is wiped. In one aspect, the virtual block device 190 may be set in a mode where the virtual block device can track which blocks are erased during the wiping process.

After the wiping of the storage capacity is completed, at block 706, the processors 144 may receive a second dirtied block mapping associated with the storage capacity. Receiving the second dirtied block mapping by the processors 144 from the virtual block device 190 may be responsive to a request for a dirtied block mapping associated with the storage capacity generated by the processors 144 and provided to the virtual block device 190. The second dirtied block mapping may correspond to the blocks of the storage capacity that have been wiped.

At block 708, the second dirtied block mapping may be analyzed to verify if all of the dirtied blocks of the storage capacity have been wiped. Therefore, the verification of the wiping of the storage capacity and/or the associated storage devices 160(1)-(N) may be performed by determining if any of the blocks on the second block mapping indicates that a dirtied block was not subsequently wiped. For example, the processors 144 may parse through the second dirtied block mapping and determine from the parsing if any blocks are still dirtied after the wiping process. In certain embodiments, the total number or percentage of insufficiently wiped blocks of the storage capacity may be determined.

At block 710, it may be determined if the storage capacity has been sufficiently wiped. If it is found at block 708 that all of the dirtied blocks of the storage capacity were wiped, then it may be deemed that the storage capacity and/or the associated storage devices 160(1)-(N) have been sufficiently wiped. If however, one or more blocks are not wiped as indicated on the second dirtied block mapping for at least one or more of the blocks of the storage capacity and/or the associated storage devices 160(1)-(N), then it may be deemed that the storage capacity and/or the associated storage devices 160(1)-(N) have not been sufficiently wiped. In certain embodiments, the storage capacity may be deemed to be sufficiently wiped if the total number or total percentage of improperly wiped blocks of the storage capacity and associated storage devices 160(1)-(N) is below a respective predetermined threshold upper limit.

If at block 710 it is determined that the storage capacity has not been sufficiently wiped, then at block 712 the non-wiped blocks of the storage capacity may be wiped. In other words, portions of the storage capacity and associated storage devices 160(1)-(N) may be re-wiped. The non-wiped blocks of the storage capacity may be determined by the processors 144 by comparing the first and second dirtied block mapping. In certain other embodiments, all of the blocks of the storage capacity may be re-wiped, rather than wiping only the non-wiped blocks.

After wiping the non-wiped blocks the method 700 may proceed to block 714, where the virtual block device 190 may be reset. In one aspect, this may entail deleting a block tracking file or erasing the virtual block device 190. At block 710, if it is determined that the storage capacity is sufficiently wiped, then the method 700 may proceed directly to block 714. Upon resetting, the virtual block device 190 may again be ready to be slaved off of the storage capacity or individual storage devices 160(1)-(N) to track the dirtying of the blocks of the storage devices.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A method, comprising:
   receiving, by one or more computers comprising one or more processors, a request to terminate a first virtual machine instance;
   identifying, by the one or more computers, one or more storage devices associated with the first virtual machine instance;
   receiving, by the one or more computers from a virtual block device, a first dirtied block mapping associated with the one or more storage devices;
   determining, by the one or more computers, dirtied blocks of the one or more storage devices based at least in part on the first dirtied block mapping;
   wiping, by the one or more computers, the dirtied blocks of the one or more storage devices;
   receiving, by the one or more computers from a virtual block device, a second dirtied block mapping indicative of the wiped dirtied blocks of the one or more storage device;
   verifying, by the one or more computers, by comparing the first dirtied block mapping to the second dirtied block mapping, that the one or more storage devices are wiped; and
   associating, by the one or more computers, the one or more storage devices with a second virtual machine instance.

2. The method of claim 1, wherein identifying one or more storage devices associated with the first virtual machine instance further comprises accessing a storage device management module.

3. The method of claim 1, further comprising generating, by the one or more computers, a dirtied block mapping request.

4. The method of claim 3, further comprising the virtual block device generating the first dirtied block mapping responsive to receiving the dirtied block mapping request.

5. The method of claim 1, further comprising determining, by the one or more computers, that the one or more storage devices are not damaged.

6. The method of claim 1, further comprising slaving the virtual block device off of the one or more storage devices.

7. The method of claim 1, further comprising the virtual block device tracking blocks of the one or more storage devices to which data is written.

8. The method of claim 7, wherein the first dirtied block mapping is indicative of blocks of the one or more storage devices to which data is written.

9. The method of claim 1, wherein the one or more storage devices are sufficiently wiped if data is erased from a predetermined percentage of the blocks of the one or more storage devices.

10. The method of claim 1, further comprising storing data on the one or more storage devices after resetting the virtual block device.

11. A system, comprising:
    at least one memory that stores computer-executable instructions;
    at least one processor configured to access the at least one memory, wherein the at least one processor is configured to execute the computer-executable instructions to:
    identify a storage device;
    track blocks of the storage device that are dirtied using a dirtied block mapping;
    determine dirtied blocks of the storage device based at least in part on the first dirtied block mapping;
    wipe the storage device;
    determine a second dirtied block mapping indicative of the wiped blocks of the storage device; and
    verify if the storage device is wiped by comparing the first dirtied block mapping to the second dirtied block mapping.

12. The system of claim 11, wherein identifying the storage device comprises accessing a storage device management module.

13. The system of claim 11, further comprising a virtual block device configured to track the dirtied blocks of the storage device.

14. The system of claim 13, wherein tracking blocks of the storage device that are dirtied comprises slaving the virtual block device off of the storage device.

15. The system of claim 13, wherein the virtual block device is erased after verifying if the storage device is wiped.

16. The system of claim 11, wherein wiping the storage device comprises wiping each of the blocks of the storage device.

17. The system of claim 11, wherein wiping the storage device comprises wiping only the dirtied blocks of the storage device.

18. The system of claim 11, wherein the at least one processor is configured to re-wipe the storage device if the storage device is not wiped.

19. The system of claim 18, wherein re-wiping the storage device comprises re-wiping only unwiped blocks of the storage device.

20. At least one non-transitory machine-readable medium comprising computer-executable instructions that, when executed by one or more processors, executes a method comprising:
    tracking dirtied blocks of a storage device;
    determining a first dirtied block mapping indicative of the tracked dirtied blocks of the storage device;

wiping the storage device and tracking wiped blocks of the storage device;

determining a second dirtied block mapping indicative of the tracked wiped blocks of the storage device; and verifying that the storage device is wiped based at least in part on comparing the first dirtied block mapping to the second dirtied block mapping.

21. The non-transitory machine-readable medium of claim 20, wherein tracking the dirtied blocks of the storage device comprises slaving a virtual block device off of the storage device.

22. The non-transitory machine-readable medium of claim 21, wherein the method further comprises erasing the virtual block device prior to wiping the storage device.

23. The non-transitory machine-readable medium of claim 21, wherein receiving the first dirtied block mapping comprises providing a first dirtied block mapping request to the virtual block device.

24. The non-transitory machine-readable medium of claim 21, wherein tracking the wiped blocks of the storage device comprises slaving the virtual block device off of the storage device during wiping the storage device.

25. The non-transitory machine-readable medium of claim 20, wherein wiping the storage device comprises wiping each block of the storage device.

26. The non-transitory machine-readable medium of claim 20, wherein verifying that the storage device is wiped comprises determining the number of unwiped dirtied blocks of the storage device based, at least in part, on comparing the first dirtied block mapping to the second dirtied block mapping.

27. The non-transitory machine-readable medium of claim 20, wherein the method further comprises associating the storage device to a virtual machine instance.

28. A method, comprising:

writing data to one or more blocks of a storage device;

tracking the one or more blocks to which data is written on the storage device, wherein tracking the one or more blocks to which data is written comprises the virtual block device generating a first dirtied block mapping indicating the one or more blocks to which data is written;

wiping the storage device;

determining the wiped blocks of the storage device, wherein determining the wiped blocks comprises the virtual block device generating a second dirtied block mapping indicating the one or more blocks that were wiped;

determining that the storage device is wiped by comparing the first dirtied block mapping to the second dirtied block mapping.

29. The method of claim 28, wherein tracking the one or more blocks to which data is written comprises slaving a virtual block device off of the storage device.

30. The method of claim 28, further comprising providing a first virtual machine instance and terminating the first virtual machine instance after the tracking the one or more blocks.

31. The method of claim 28, further comprising providing a second virtual machine instance after determining the storage device is sufficiently wiped.

* * * * *